Sept. 22, 1925.

D. McKAY

DIRIGIBLE HEADLIGHT

Filed Nov. 19, 1923

1,554,447

D. McKay, Inventor

By C. A. Snow & Co.
Attorneys

Patented Sept. 22, 1925.

1,554,447

UNITED STATES PATENT OFFICE.

DONALD McKAY, OF MONTGOMERY, ALABAMA.

DIRIGIBLE HEADLIGHT.

Application filed November 19, 1923. Serial No. 675,685.

*To all whom it may concern:*

Be it known that I, DONALD McKAY, a citizen of the United States, residing at Montgomery, in the county of Montgomery and State of Alabama, have invented a new and useful Dirigible Headlight, of which the following is a specification.

This invention relates to dirigible headlights constructed with especial reference to motor vehicles, the main object being to produce means operated automatically in conjunction with the steering mechanism of a vehicle of the class described, whereby the headlights are turned simultaneously with the steering wheels at the front of the machine for the purpose of directing the illuminating rays from the headlight upon that portion of the roadway about to be followed by the machine in accordance with the angle of the steering wheels.

Another object of the invention is to provide a simple and efficient attachment for converting the ordinary stationary lamps of an automobile into dirigible lamps without changing either the lamps or the automobile.

Another object is to provide an attachment of this character constructed so as to turn the lamps with the steering mechanism and composed of parts so connected as to prevent jolts and jars incident to the passage of the wheels over rough surfaces from being transmitted to the lamps.

With the foregoing and other objects in view which will appear as the description proceeds the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1:
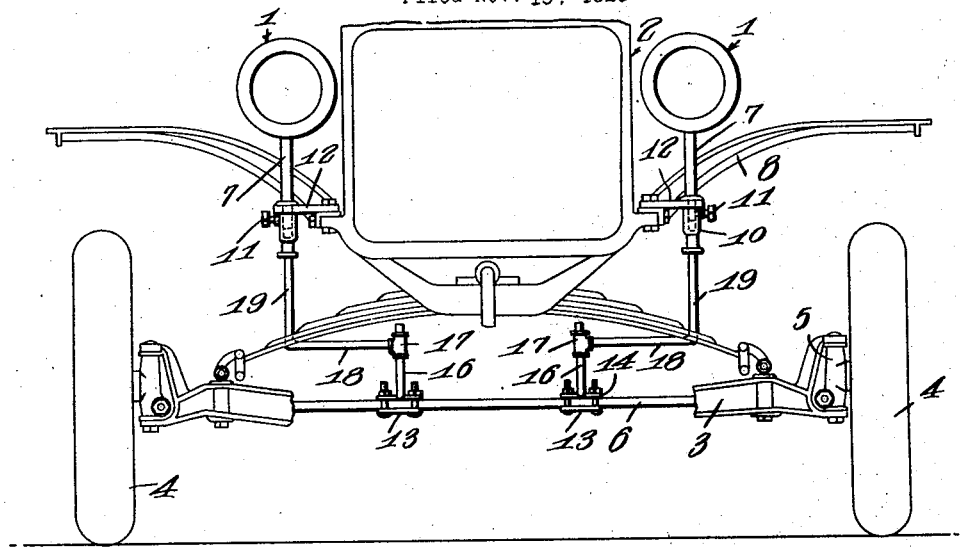
Figure 1 represents a front elevation of a portion of an automobile shown equipped with this improved attachment the axle being broken out for convenience in illustration.
Figure 2:
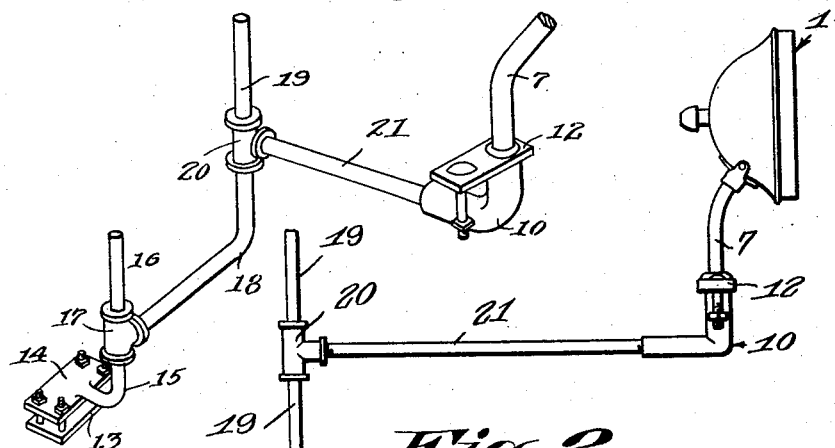
Fig. 2 is a side elevation of the attachment with the steering rod on which it is mounted shown in section.
Figure 3:
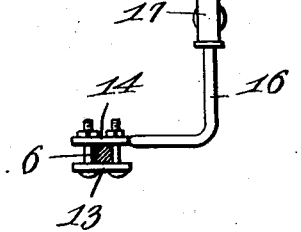
Fig. 3 is a detail perspective view of the attachment detached with the lamp post broken off.

In the drawings, wherein like characters of reference designate corresponding parts, the usual stationary vehicle headlights 1 are shown positioned one on each side of the radiator 2 and supported on the vehicle frame above the front axle 3. This axle is supported by the usual front wheels 4 the steering knuckles 5 of which allow the steering wheels to be turned relative to the axle by means of the steering rod 6 which connects the knuckles and which is actuated by the steering post of the automobile not shown. Nothing new is claimed with reference to the parts thus far described.

The headlights 1 which are positioned one on each side of the radiator 2 have the usual posts 7 which are mounted in the fender supports 8 said supports being apertured to receive the standards or posts 7 such structure being a well know one in use on a popular make of automobile.

In carrying out the present invention the lamp post 7 is withdrawn from the fender support 8 and is mounted in a socket 10 and held secured therein by a set screw 11. This socket 10 is loosely mounted for rotation in a bracket 12 which extends laterally from the automobile frame at one side of the radiator as is shown clearly in Fig. 1.

Mounted on the steering gear rod 6 is a clamp 13 from the upper member 14 of which extends an L-shaped standard 15 the longer arm 16 of which is arranged vertically and has slidably mounted thereon a T-shaped coupling 17 which carries another L-shaped rod 18 the free arm 19 of which extends upwardly and has another T-shaped coupling 20 mounted to slide thereon. The coupling 20 carries a laterally extending rod 21 which is fixedly secured in one end of the socket member 10. The socket member 10 is L-shaped in form and the other end thereof which is rotatably mounted in the bracket 12 carries the lamp post 7.

It is of course understood that one of these attachments is located at each side of the automobile and connected with the lamps 1, the attachments being exactly alike in construction.

From the above description it will be obvious that when the attachments are mounted as shown in Fig. 1 there is no alteration made in the car except to substitute the bracket 12 for the support which holds the lamp post 7. When the steering mechanism is operated the rod 6 will be moved longitudinally according to the direction in which the wheels 4 are to be turned and the motion imparted to said rod is transmitted through the clamps 13 and the rods connected therewith to the lamp posts 7, so that the lamps are turned in the same direction that the wheels are.

The loose or slidng connection of the couplings 17 and 20 with the posts 16 and 19 permits the axle and the steering rod 6 to move vertically up or down without transmitting such motion to the lamps thereby avoiding the jolts and jars incident to such movement.

It will be seen that this attachment may be readily installed by an unskilled workman by simply mounting the brackets 12 on the bolts which connect the radiator to the frame, then removing the lamp posts 7 from the fender supports 8 and inserting them in the sockets 10 where they are secured by the set screws 11. These sockets 10 are rotatably mounted in the brackets 12. The clamps 13 are then rigidly secured to the steering rod 6 and the device is ready for use.

I claim:—

A dirigible headlight attachment for automobiles comprising adjustably connected clamping plates for connection with the steering rod of an automobile, the uppermost of said plates having an upstanding rod fixed thereto and offset laterally therefrom, an L-shaped rod having a T-shaped coupling at one end, said coupling being slidably mounted on said upstanding rod and with its other end extending vertically upward, another rod having a T-shaped coupling at one end slidably mounted on the upright arm of said L-shaped rod and rotatable on said arm and normally extending in a plane at right angles to the horizontal arm of the L-shaped rod, an elbow coupling having one end fixed to said last mentioned rod, an attaching plate carried by the upstanding member of the elbow and adapted for connection with the radiator of an automobile, the upstanding member of said elbow coupling being designed to receive the post of a lamp and equipped with means for fixedly holding the post in the socket formed by the upper end of the elbow.

In testimony that I claim the foregoing as my own, I have hereto affixed my signature.

DONALD McKAY.